United States Patent Office 2,712,085
Patented June 28, 1955

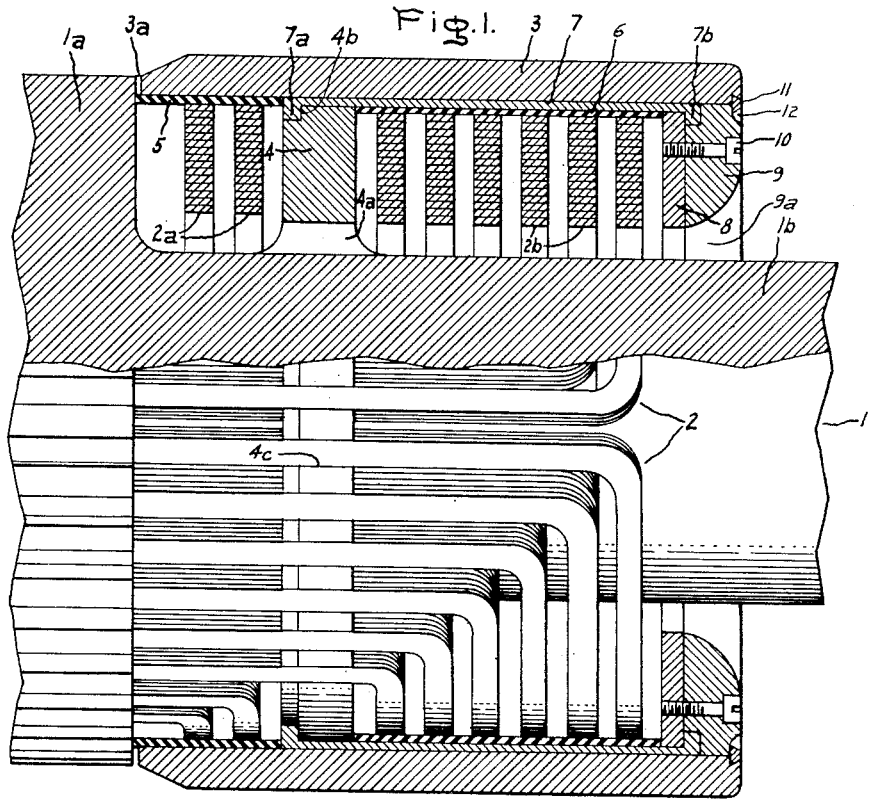

2,712,085

RETAINING RING STRUCTURE FOR END WINDINGS OF DYNAMO-ELECTRIC MACHINE

David M. Willyoung, Schenectady, N. Y., assignor to General Electric Company, a corporation of New York Application May 11, 1953, Serial No. 354,313

7 Claims. (Cl. 310—262)

This invention relates to large capacity dynamo-electric machines, particularly to an improved retaining ring arrangement for supporting the end portions of the rotor windings, as for instance in large turbine-driven generators.

The usual rotor construction for a modern synchronous generator employs a solid steel shaft of large diameter, slotted axially to accept current carrying windings. The center slotted section of this shaft is known as the rotor body. At the ends of the rotor body, the shaft is reduced in diameter, allowing the end portion of the conductors to extend circumferentially through an arc around the reduced diameter portion and so to form closed coils. The windings are held in the rotor body by coil wedges across the tops of the slots. The centrifugal force of the coil ends which extend outside the rotor body slots are held by a retaining ring which encircles the coil ends.

This retaining ring has sometimes been mounted on the shaft structure by means of a shrink fit between one end of the retaining ring and another ring which is shrunk onto the reduced shaft diameter adjacent to the bearing. In other cases, the retaining ring has been supported by means of a shrink fit between the other end of the ring and a shoulder on the adjacent portion of the rotor body, utilizing some form of axial or circumferential grooves, notches, or radial holes in the retaining ring to prevent axial motion of the ring.

In all such constructions, the following problems are present. (a) The centrifugal force of the retaining ring and the coil ends which it supports impose tremendous stresses in the retaining ring. Any "stress-raisers" in the retaining ring aggravate these high stresses and create a serious hazard. (b) The retaining ring must be prevented from moving axially on the shaft under the forces developed by the windings as they expand. (c) The rotor end construction must provide sufficient passages for ventilating gas to flow over the end windings and into the rotor body, as required by the particular ventilating system employed. (d) The end construction should be such that the reduced diameter at the end of the rotor body is maintained sufficiently large so that the critical frequency of lateral vibration of the shaft is high. (e) When the generator develops magnetic fields in the air gap, which do not rotate in synchronism with the rotor, currents are induced in the solid steel shaft. Such non-synchronous fields appear when the generator is short-circuited, or runs with unequal currents in the stator phases, or operates out of synchronism with the power system to which it is connected. These circulating currents in the shaft are largely confined to the rotor surface by the so-called "skin effect," which is particularly marked in magnetic steel. When the retaining ring is shrunk directly on a shoulder on the rotor body, large circulating currents tend to flow from the rotor body across the shrink fit into the retaining ring, then circumferentially around the retaining ring and back into the rotor body one pole pitch away. The shrink fit between the ring and body constitutes a high resistance joint in this current path, resulting in severe localized heating. In some cases, this heating has been sufficient to cause pitting of the highly stressed retaining ring and serious changes in the physical properties of the metal in the vicinity of the shrink fit. (f) When, on the other hand, the retaining ring is supported by a shrink fit at the other end, adjacent to the bearing, with no contact between the retaining ring and the rotor body proper, as is the other practice common in the art, pitting and deterioration of the retaining ring does not occur. However, due to the bending of the shaft between the end of the rotor body and the shrink fit supporting the retaining ring, this latter construction subjects the windings to a low cyclic fatigue stress occurring at the rotational frequency of the shaft, at the point where the windings emerge from the rotor body and pass under the retaining ring. This fatigue action is aggravated by the tendency of the non-supported end of the retaining ring adjacent to the rotor body to move radially with respect to the rotor body when the speed of rotation and consequently the centrifugal force on the ring changes. Such radial motion subjects the windings to additional flexure at the same location. In some cases these fatigue actions have produced fatigue fractures of the windings.

Accordingly, an object of the present invention is to provide an improved generator retaining ring construction which avoids the shrink fit between the retaining ring and rotor body, so as to avoid the above-described troubles, due to burning and pitting at the shrink fit.

Another object is to provide a generator retaining ring structure which supports the retaining ring fairly close to the end of the rotor body so as to reduce the cyclic fatigue stress developed in the windings and virtually eliminate relative radial movement between the end of the retaining ring and the rotor body which occurs with changes in speed.

A further object is to provide a strong structure which firmly locks the retaining ring against axial movement, without the necessity of notches, holes, or other "stress-raisers" in the highly stressed ring.

A still further object is to provide an improved retaining ring construction which occupies small space, has only a few simple parts, and is comparatively easy to assemble.

Another object is to provide a generator rotor construction in which the reduced diameter shaft portion adjacent the rotor body is relatively stiff, giving improved critical speed characteristics.

A further object is to provide a generator retaining ring structure providing ample passages for ventilating gas, without grooves in the shaft end portion.

Other objects and advantages will become apparent from the following description taken in connection with the accompanying drawings, in which Figure 1 is a longitudinal sectional view of an improved generator retaining ring construction, in accordance with the invention, and Figures 2, 3, and 4 are perspective views of alternate forms of one component of the assembly.

Generally stated, the invention is practiced by providing on the generator rotor an integral supporting flange which is spaced axially from the main body of the rotor, at an intermediate location with respect to the end turns of the rotor winding. This supporting flange is slotted where necessary to allow the windings and ventilating fluid to pass through it into corresponding slots in the rotor body. The retaining ring is shrunk on this integral supporting ring. The axial thrust, which the winding imposes on the retaining ring assembly, is taken by a special tension cylinder member which has one end engaging the supporting flange on the rotor while the other is locked to the retaining ring assembly at its other end.

Referring now more particularly to the drawings, the invention is shown as applied to a generator rotor, indicated generally at 1, as having a cylindrical body portion 1a and a smaller diameter rotor shaft end portion 1b. The electrical winding comprises a plurality of conductor bar structures disposed in slots (not shown) in the rotor body and having end portions shown generally at 2. These winding end portions are supported against the action of centrifugal force by a high strength retaining ring 3.

In accordance with the invention, the ring 3 is not supported by a shrink fit at either end, as previously customary in the art. Instead, the ring is secured by a shrink fit around the integral supporting flange 4. This flange will, of course, have a plurality of circumferentially spaced slots 4c to allow the coil ends to pass through, and may have other passages 4a for ventilating gas.

It is to be particularly observed that a certain number of the end windings identified 2a may be disposed between the supporting flange 4 and the rotor body 1a. The remainder of the end turns pass through appropriate radial slots 4c in the supporting flange 4 and are disposed at the right-hand side of the integral supporting flange as shown at 2b. This arrangement has the very important electrical effect of reducing the induced current which tries to flow through the supporting flange 4 across the shrink fit and into the retaining ring 3. The substantial axial clearance space provided at 3a between the left-hand end of ring 3 and the adjacent portion of the rotor body 1a insures that there will be no substantial tendency for this induced current (which is crowded to the rotor surface by skin effect) to flow from the rotor body into the left-hand end of the ring. The tendency for burning or pitting at the shrink fit with its consequently hazardous "stress-raisers" is at least reduced, and perhaps eliminated, by the tenuous path that the current must now follow in order to flow into the retaining ring. This arrangement also has the very important mechanical effect of reducing the flexing of the rotor winding which would occur if the shrink fit were located at the extreme right-hand end of the retaining ring, as is common in the prior art.

It will be seen in Figure 1 that the conductor portions 2a are electrically insulated from the ring 3 by an encircling cylinder of insulating material 5, which may be a solid ring or segmental with lapped joints. Similarly, the conductor end turn portions 2b are insulated by a thinner tube of insulating material identified as 6.

In operation, centrifugal force throws the winding end portions 2a, 2b outward so as to impose tremendous stresses on the retaining ring 3. At the same time, thermal expansion of the conductor bars causes the end portions to attempt to move axially as the machine comes up to normal operating temperature, which may be on the order of 200° F. The very substantial friction force between the end turns and the retaining ring, taken in combination with this thermal expansion of the bars, results in a very strong tendency for the ring 3 to move axially to the right as the bars expand. Such motion must, of course, be resisted. This function is performed by the tension cylinder shown at 7.

It will be seen in Figure 1 that the tension member 7 has an inwardly extending end flange portion, identified 7a, which locks over a circumferential groove or rabbet 4b formed in the supporting flange. The right-hand end of the tension member 7 is also provided with an inwardly extending portion 7b which is clamped between a ring member 8 and an outer ring 9. The outer ring 9 is secured to the ring 8 by a plurality of circumferentially-spaced, threaded fastenings 10. As shown in Figure 1, a shrink fit between the retaining ring 3 and the integral supporting flange 4 is made, with the tension tube 7 between.

With this construction, it will be apparent that the friction force imposed by the longitudinally expanding windings 2b is taken in tension on the member 7. Thus, ring 3 is prevented from shifting axially to the right. In this connection, it will be noted that the insulating tube 5 also acts as a spacer, preventing the member 7 from sliding axially to the left, as shown in the arrangement in Figure 1.

Possible alternate constructions of the tension member 7 are illustrated in Figures 2, 3, and 4. In Figure 2, the cylindrical tension member 7 is made in four arcuate segments 7c, 7d, 7e, and 7f. The end flange portions 7a of these members are slotted at 7m to allow the windings 2b to pass axially when the tension tube 7 is assembled as shown in Figure 1.

The assembly procedure for the arrangement of Figure 1, using the tension tube construction of Figure 2, would be as follows:

After assembly of the windings 2a and 2b in their appropriate positions, the insulating tubes 5 and 6 are assembled around the windings segmentally. The tension tube segments 7c, 7d, 7e, 7f, are then positioned with the ring 8, as shown in Figure 1. Ring 9 is then locked to ring 8 with the threaded fastenings 10. The retaining ring 3 is then expanded by heating and slid over the segments of the tension tube 7, the insulating tube 5, and the outer end ring 9. Contraction of the heated ring will produce a shrink fit with the required tightness on the supporting flange 4 and also at the right-hand end against ring 9.

A plurality of dovetail locking key segments 11 are then inserted through a slot 12 in the outer ring 9 and driven peripherally so as to firmly lock ring 9 and ring 3 together.

With the arrangement of Figure 3, the cylinder 7g is made up in one piece and provided with diametrically disposed saw-slots 7h and 7i. These slots extend a sufficient distance axially to give the flexibility required to expand the end flange 7a over the shoulder and into position in the rabbet 4b of the supporting flange 4.

The arrangement of Figure 4 is easier to assemble since it has a large number of saw-slots 7j defining flexible fingers 7k which could obviously be easily bent outward to spring over the flange rabbet portion 4b. This latter arrangement has the added advantage that the tension tube will largely carry its own weight against the action of centrifugal force and may even share in carrying a portion of the centrifugal load of the coil ends 2b, thereby reducing the very high stresses in ring 3.

It will, of course, be apparent that many equivalent mechanical constructions might be selected for the cylindrical tension member 7, in addition to those shown in Figures 2, 3, and 4.

The characteristic feature of the invention is that the ring supporting flange 4 is spaced axially a substantial distance from the rotor body 1a, and a special tension cylinder member 7 is provided to resist axial shifting of the retaining ring 3 under the influence of the friction forces imposed by the expanding and contracting conductor bars 2b, this tension tube being located directly beneath the retaining ring 3 and extending to the right to enable the retaining ring to be locked to it, at its outer end where this locking arrangement is easily accessible and can be made without using stress-raising holes or grooves in the retaining ring.

An important advantage of this construction lies in the fact that free access for coolant fluid is provided by way of the radial clearance space, identified 9a, between the conductor bars 2 and end ring member 9 and the shaft portion 1b. This is achieved without the necessity for cutting any grooves in the shaft portion 1b which, of course, would reduce the stiffness of the rotor shaft and thereby impair the critical speed characteristics.

By locating the supporting flange 4 reasonably close to the rotor body portion 1a, the tendency of the windings to flex at location 3a, due to bending and rotation of the shaft and due to radial expansion of the left-hand end of ring 3 as the speed of the rotor is increased, is reduced to a comparatively small amount. At the same time, supporting flange 4 is spaced axially from the body 1a a sufficient distance to materially reduce the burning and pitting, due to stray currents traversing the shrink fit between the ring and flange, which would be present if direct metallic contact were made at location 3a between the rotor body 1a and retaining ring 3.

It is also to be noted that the retaining ring 3 itself has no axial grooves, holes, or other discontinuities. A simple smooth-surfaced ring of this construction has maximum strength in resisting the tremendous centrifugal force imposed by the conductor end portions. It will also be noted that the construction requires no complicated assembly techniques.

It is, of course, intended to cover by the appended claims the alternate constructions described herein and all other equivalent arrangements falling within the true spirit and scope of the invention.

What I claim as new and desire to secure by Letters Patent of the United States is:

1. In a retaining ring construction for a dynamo-electric machine rotor having conductors disposed in axial slots in the rotor body with a plurality of conductor end portions extending circumferentially through an arc around a reduced diameter end portion of the rotor, the combination of a supporting flange member secured to the reduced shaft end portion of the rotor and spaced axially from the rotor body with a plurality of conductor end portions disposed at either side of said supporting flange, a first insulating tube member disposed around the end turns between the body and the supporting flange, a second insulating tube member disposed at the opposite side of the supporting flange and surrounding the remaining winding end turns, a retainer ring member surrounding said first and second insulating tube members and adapted to form a shrink fit therearound, one end of the retainer ring defining a clearance space with the adjacent rotor body, and a tension tube member disposed between the retainer ring and said second insulating tube member and having one end portion adapted to lock into the circumference of said supporting flange, the opposite end of the tension tube member having an extreme end portion connected to prevent axial sliding of the retaining ring under the influence of friction forces imposed by the winding end turns due to differential thermal expansion between the conductors and rotor.

2. In a retaining ring construction for a dynamo-electric machine rotor having conductors disposed in axial slots in the rotor body with a plurality of conductor end portions extending circumferentially through an arc around a reduced diameter end portion of the rotor, the combination of a supporting flange member secured to the reduced shaft end portion of the rotor and spaced axially from the rotor body with at least one conductor end portion disposed at either side of said supporting flange, a first insulating tube member disposed around the conductor end turns between rotor body and supporting flange, a second insulating tube member disposed around the conductor end portions at the side of said supporting flange remote from the rotor body, a retainer ring member surrounding said first and second insulating tube members and having one end portion defining a clearance space with the adjacent portion of the rotor body, and a tension tube member disposed between the retainer ring and said second insulating tube member and having a first end portion defining a rabbet fit with said supporting flange and a second end portion shaped to prevent axial sliding movement of the second insulating tube member under the influence of friction forces imposed thereon by the winding end turns due to differential thermal expansion between the conductors and the rotor.

3. In a retaining ring structure for a dynamo-electric machine rotor having conductors disposed in axial slots in the rotor body with a plurality of conductor end portions extending circumferentially through an arc around a reduced diameter end portion of the rotor, the combination of a rotor portion extending radially from said reduced diameter end portion, a retaining ring spaced radially from the reduced diameter end portion of the rotor and surrounding the conductor end portions, and at least one circumferentially extending tension member disposed between the conductor end portions and said retaining ring and having one end portion secured to said radially extending rotor portion, said tension member serving as an intermediate bearing member to prevent axial shifting of the retaining ring under the influence of differential thermal expansion between the conductors and rotor.

4. In a retaining ring structure for a dynamo-electric machine rotor having conductors disposed in axial slots in the rotor body with a plurality of conductor end portions extending circumferentially through an arc around a reduced diameter end portion of the rotor, the combination of a supporting flange member secured to the reduced diameter end portion of the rotor and spaced axially from the rotor body with at least one conductor end portion disposed at either side of the flange, a retainer ring member surrounding the conductor end portions and spaced radially from said supporting flange, and at least one circumferentially extending tension member disposed between the retainer ring and the circumference of the supporting flange and having a first end portion connected to the flange and a second portion surrounding the conductor end portions at the side of said flange remote from the rotor body, whereby the tension member resists axial sliding movement of the retainer ring under the influence of friction forces imposed on the tension member by the winding end portions due to differential thermal expansion between conductors and rotor.

5. Retaining ring construction in accordance with claim 4 in which the tension member comprises a plurality of arcuate segments adapted to be disposed around the supporting flange before the retaining ring is assembled.

6. Retaining ring construction in accordance with claim 4 in which the tension member comprises a hollow cylinder having an inwardly extending circumferential flange adapted to define a rabbet fit with the supporting flange, said cylinder member having at least one pair of circumferentially spaced axially extending slots rendering the cylinder sufficiently resilient that said flanged end can be expanded over the supporting flange.

7. Retaining ring construction in accordance with claim 4 in which the tension member comprises a hollow cylinder having a plurality of axially extending resilient finger portions, each finger having a radially inwardly extending lug portion adapted to engage the supporting flange, whereby said resilient finger portions may be flexed outwardly so as to pass over the flange during assembly.

References Cited in the file of this patent

UNITED STATES PATENTS 2,094,358    Kilgore    Sept. 28, 1937

FOREIGN PATENTS 35,681    France    Oct. 1, 1929
(First addition to No. 666,851)